United States Patent
Li et al.

(10) Patent No.: US 11,205,060 B2
(45) Date of Patent: Dec. 21, 2021

(54) LOOPBACK MODE FOR BYPASSING A CAMERA OF AN APPARATUS

(71) Applicant: CITRIX SYSTEMS, INC., Burlington, MA (US)

(72) Inventors: Jin Li, Nanjing (CN); Guoyi Zhou, Nanjing (CN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

(21) Appl. No.: 16/712,437

(22) Filed: Dec. 12, 2019

(65) Prior Publication Data

US 2021/0142023 A1 May 13, 2021

Related U.S. Application Data

(63) Continuation of application No. PCT/CN2019/117052, filed on Nov. 11, 2019.

(51) Int. Cl.
*G06K 7/14* (2006.01)
*H04N 5/232* (2006.01)

(52) U.S. Cl.
CPC ......... *G06K 7/1443* (2013.01); *G06K 7/1417* (2013.01); *G06K 7/1447* (2013.01); *H04N 5/23218* (2018.08); *H04N 5/23245* (2013.01); *H04N 5/232933* (2018.08)

(58) Field of Classification Search
CPC ..................................................... G06K 7/1443
USPC ..................................................... 235/462.1
See application file for complete search history.

(56) References Cited

U.S. PATENT DOCUMENTS

2011/0163166 A1* 7/2011 Wang ................. H04N 5/23245
235/472.01
2017/0048402 A1* 2/2017 Vecera ............... H04N 1/00127

* cited by examiner

*Primary Examiner* — Rafferty D Kelly
(74) *Attorney, Agent, or Firm* — Mintz Levin Cohn Ferris Glovsky and Popeo, P.C.

(57) ABSTRACT

A method may include receiving, at a mobile device, a request to capture an image. In response to the request to capture the image, the mobile device may determine whether a camera of the mobile device is in a loopback mode to bypass the camera. In response to the camera being in the loopback mode, the mobile device may capture the image by generating a screenshot of a display associated with the mobile device. Alternatively, in response to the camera not being in the loopback mode, the mobile device may allow the camera at the apparatus to capture the image. Related systems and articles of manufacture, including computer program products, are also provided.

15 Claims, 8 Drawing Sheets

LOOPBACK MODE FOR BYPASSING A CAMERA OF AN APPARATUS

CROSS REFERENCE TO RELATED APPLICATIONS

This application is a continuation application of International Application No. PCT/CN2019/117052, filed Nov. 11, 2019 and entitled "LOOPBACK MODE FOR BYPASSING A CAMERA OF AN APPARATUS," the contents of which are hereby incorporated by reference in their entirety.

TECHNICAL FIELD

The subject matter described herein relates generally to image processing and more specifically to a loopback mode for bypassing a camera of an apparatus.

BACKGROUND

Modern mobile devices, such as smartphones and tablet computers, may include at least one camera and are thus capable of capturing digital images. A mobile device equipped with a camera may include one or more applications that enable a user to operate the camera including, for example, to activate a shutter of the camera to capture an image. To expedite access to the camera, the mobile device may include a physical button for activating the shutter of the camera. Furthermore, the mobile device may also include applications for editing and sharing the images captured by the mobile device.

SUMMARY

Systems, methods, and articles of manufacture, including computer program items, are provided for capturing an image. In one aspect, there is provided an apparatus. The apparatus may include a camera, a display, at least one data processor, and at least one memory. The at least one memory may store instructions which, when executed by the at least one data processor cause the apparatus to at least: receive a first request to capture an image; in response to the first request, determine whether the camera is in a loopback mode to bypass the camera; in response to the camera being in the loopback mode, capture the image by least generating a screenshot of the display; and in response to the camera not being in the loopback mode, allow the camera to capture the image.

In some variations, one or more features disclosed herein including the following features can optionally be included in any feasible combination. The apparatus may be further caused to at least receive a second request to place the camera in the loopback mode.

In some variations, the apparatus may be further caused to at least respond to the first request to capture the image by presenting, on the display, a graphical user interface that includes a selectable user interface element configured to trigger the loopback mode.

In some variations, the screenshot includes a barcode displayed as part of a graphical user interface presented on the display. The apparatus may be further caused to at least respond to the camera being in the loopback mode by updating the graphical user interface presented on the display to include a window defining a portion of the graphical user interface including the barcode. The window may be configured to be resized and moved within the graphical user interface to align with at least a portion of the graphical user interface including the barcode.

In some variations, the first request to capture the image may be received from a first application and the barcode may be associated with a second application. The apparatus may be further caused to at least: switch to the second application prior to the generating of the screenshot; and send, to the first application, the screenshot to at least enable the first application to parse the screenshot to retrieve the barcode.

In another aspect, there is provided a method for capturing an image. The method may include: receiving, at an apparatus, a first request to capture an image; in response to the first request, determining whether a camera at the apparatus is in a loopback mode to bypass the camera; in response to the camera being in the loopback mode, capturing the image by least generating a screenshot of a display of the apparatus; and in response to the camera not being in the loopback mode, allowing the camera to capture the image.

In some variations, one or more features disclosed herein including the following features can optionally be included in any feasible combination. A second request may be received to place the camera in the loopback mode.

In some variations, in response to the first request to capture the image, a graphical user interface that includes a selectable user interface element configured to trigger the loopback mode may be presented on the display.

In some variations, the screenshot may include a barcode displayed as part of a graphical user interface presented on the display. In response to the camera being in the loopback mode, the graphical user interface presented on the display may be updated to include a window defining a portion of the graphical user interface including the barcode. The window may be configured to be resized and moved within the graphical user interface to align with at least a portion of the graphical user interface including the barcode.

In some variations, the first request to capture the image may be received from a first application and the barcode may be associated with a second application. The method may further include: switching to the second application prior to the generating of the screenshot; and sending, to the first application, the screenshot to at least enable the first application to parse the screenshot to retrieve the barcode.

In another aspect, there is provided a computer program product including instructions. The instructions may cause operations may executed by at least one data processor. The operations may include: receiving, at an apparatus, a first request to capture an image; in response to the first request, determining whether a camera at the apparatus is in a loopback mode to bypass the camera; in response to the camera being in the loopback mode, capturing the image by least generating a screenshot of a display of the apparatus; and in response to the camera not being in the loopback mode, allowing the camera to capture the image.

In some variations, one or more features disclosed herein including the following features can optionally be included in any feasible combination. A second request may be received to place the camera in the loopback mode.

In some variations, in response to the first request to capture the image, a graphical user interface that includes a selectable user interface element configured to trigger the loopback mode may be presented on the display.

In some variations, the first request may be received from a first application. The screenshot may include a barcode associated with a second application. In response to the camera being in the loopback mode, a graphical user interface presented on the display may be updated to include a window defining a portion of the graphical user interface including the barcode.

Implementations of the current subject matter may include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a loopback mode for bypassing a camera of an apparatus, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

A mobile device equipped with a camera may be capable of capturing images of objects external to the mobile device. Nevertheless, the camera may be impractical for capturing images of objects presented on a display of the mobile device. For example, a first application at the mobile device may require a barcode that a second application presents on a display of the mobile device. The first application may have access to the camera at the mobile device but the camera is incapable of capturing an image of the barcode presented on the display of the mobile device. As such, in some example embodiments, the camera at the mobile device may be associated with a normal mode of operation and a loopback mode of operation. In order for the first application to capture an image of the barcode presented on the display of the mobile device by the second application, the camera may be activated but placed in the loopback mode. Placing the camera in the loopback mode may bypass the camera such that the mobile device may capture an image of the barcode by at least generating a screenshot of the display of the mobile device. Contrastingly, placing the camera in the normal mode may enable the camera to capture an image of one or more objects external to the mobile device.

Figure 1A:
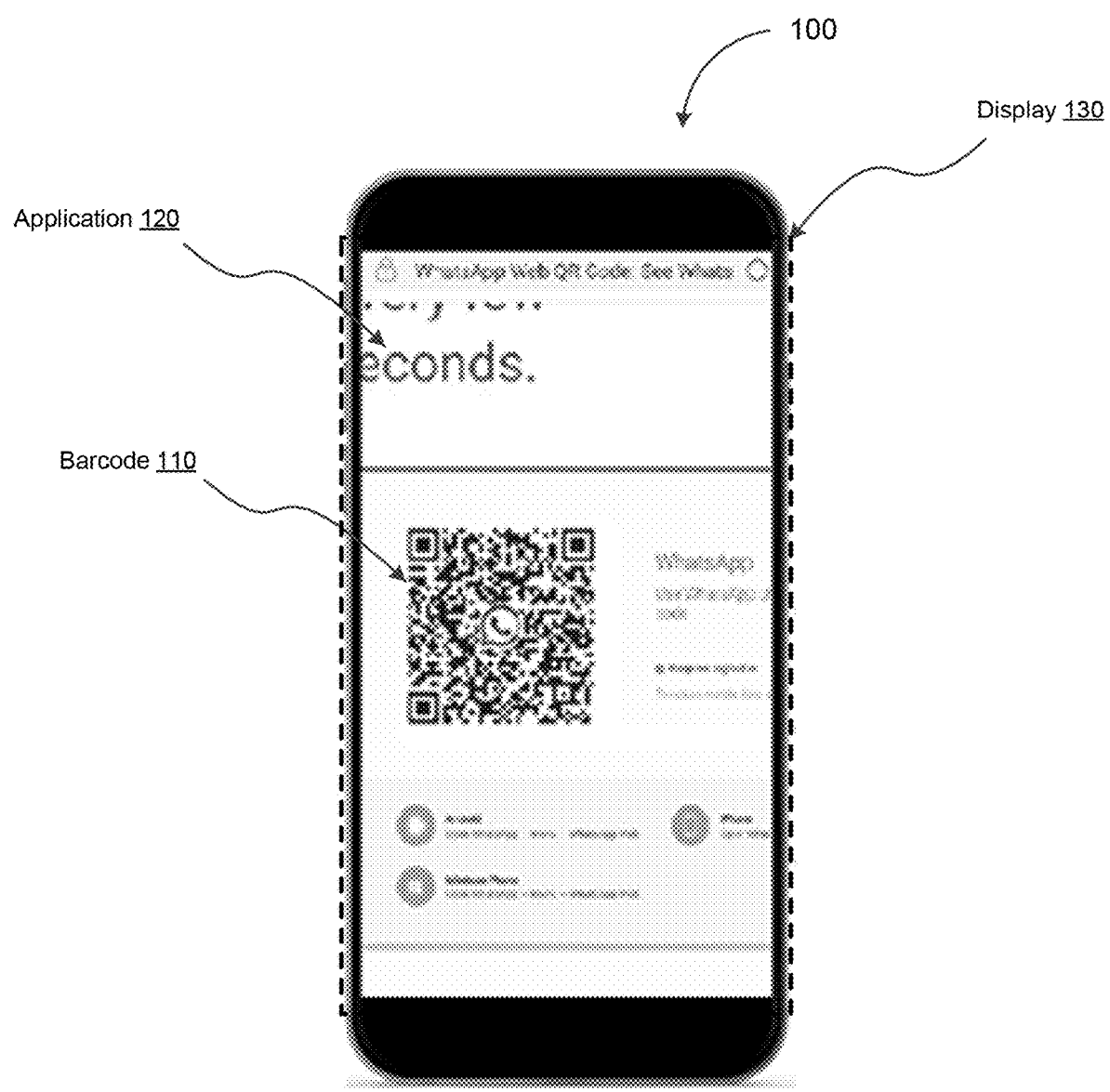
FIG. 1A depicts an example of a mobile device displaying a barcode associated with an application, in accordance with some example embodiments.

FIG. 1A depicts an example of a mobile device 100 displaying a barcode 110 associated with an application 120, in accordance with some example embodiments. Referring to FIG. 1A, the mobile device 100 may be a processor-based device including, for example, a smartphone, a tablet computer, a wearable apparatus, a laptop computer, a desktop computer, a workstation, and/or the like. The mobile device 100 may include a display 130, which may be a screen, a touchscreen, and/or the like.

As shown in FIG. 1A, the display 130 may present data associated with the application 120 including, for example, the barcode 110 and/or the like. The barcode 110 may represent, in a visual and machine-readable form, at least a portion of the data associated with the application 120. In the example shown in FIG. 1A, the barcode 110 may be a type of matrix barcode (e.g., a Quick Response (QR) code and/or the like). However, it should be appreciated that the barcode 110 may also be a linear barcode. Moreover, in addition to and/or instead of the barcode 110, the display 130 may present a variety of data associated with the application 120.

A different application at the mobile device 100 may require data from the application 120 including, for example, the data represented by the barcode 110. For example, the other application at the mobile device 100 may require the data represented by the barcode 110 in order to perform one or more operations. While the other application may have access to a camera at the mobile device 100, the camera may be incapable of capturing an image of barcode 110 presented on the display 130 of the mobile device 100. As such, in some example embodiments, the camera at the mobile device 100 may be associated with a normal mode of operation and a loopback mode of operation. The camera may be activated but placed in the loopback mode in order to capture an image of the barcode 110 presented on the display 130 of the mobile device 100. For instance, FIG. 1D depicts an example of a graphical user interface 160 for activating a camera of the mobile device 100, in accordance with some example embodiments. As shown in FIG. 1D, the camera of the mobile device 100 may be activated by a user selecting, from a user interface element 165, the "scan" option. However, it should be appreciated that the camera of the mobile device 100 may be activated in a different manner such as using a physical button on the mobile device 100.

In some example embodiments, placing the camera in the loopback mode may bypass the camera such that the mobile device 100 may capture an image of the barcode 110 by at least generating a screenshot of the display 130 of the mobile device 100. Contrastingly, placing the camera in the normal mode may enable the camera to capture an image of one or more objects external to the mobile device 100.

Figure 1B:
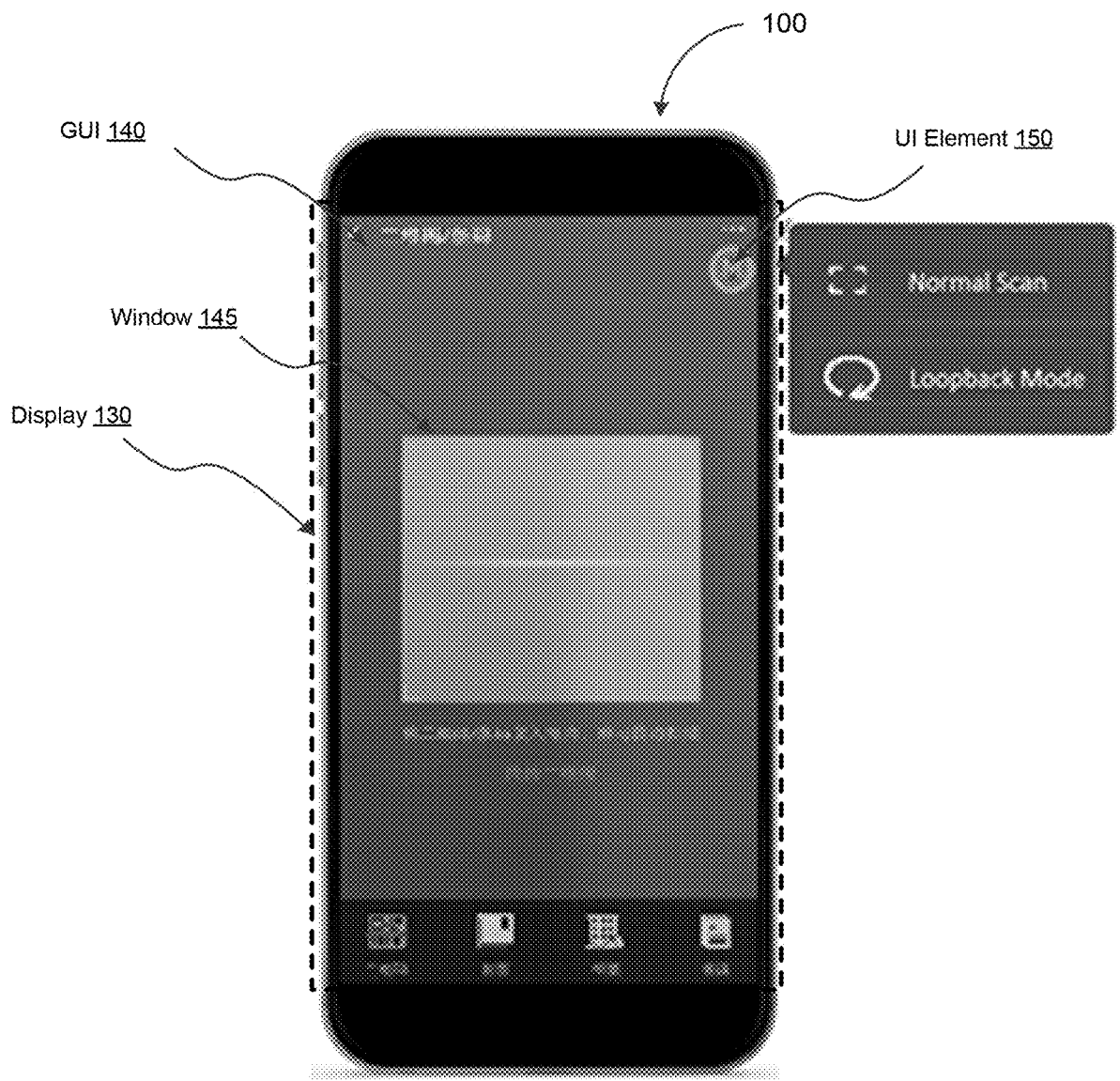
FIG. 1B depicts an example of a graphical user interface for operating a camera of a mobile device, in accordance with some example embodiments.

FIG. 1B depicts an example of a graphical user interface 140 for operating the camera of the mobile device 100, in accordance with some example embodiments. Referring to FIG. 1B, the mobile device 100 may respond to a user activating the camera at the mobile device 100 by at least presenting, on the display 130, the graphical user interface 140. In the example of the graphical user interface 140 show in FIG. 1B, the graphical user interface 140 may include a window 145 defining a portion of a field-of-view of the camera that forms the images captured by the camera at the mobile device 100. For instance, an image captured by the camera at the mobile device 100 may include a first portion of an object positioned within the window 145 but exclude a second portion of the object positioned outside of the window 145.

In some example embodiments, the graphical user interface 140 may include a user interface element 150 for selecting a mode of the camera at the mobile device 100. As noted, the camera at the mobile device 100 may be associated with a normal mode of operation and a loopback mode of operation. Accordingly, the user interface element 150 may enable a user to select between the normal mode of operation and the loopback mode of operation. In the example shown in FIG. 1B, the user interface element 150 may be a button that may be selected to place the camera in the loopback mode. However, it should be appreciated that the user interface element 150 may also be implemented as a different type of user interface element including, for example, one or more checkboxes, radio buttons, dropdown lists, list boxes, toggles, and/or the like.

In some example embodiments, the mobile device 100 may respond to the user selecting the loopback mode by at least presenting, on the display 130 of the mobile device 100, the graphical user interface 140 to enable the capturing of an image including the barcode 110 presented on the display 130 of the mobile device 100. The barcode 110 may represent data associated with the application 120. Moreover, as noted, a different application at the mobile device 100 may require the data represented by the barcode 110. The user may therefore place the camera in the loopback mode in order to capture an image of the barcode 110 presented on the display 130 of the mobile device 100. The other application at the mobile device 100 may parse the image of the barcode 110 in order to retrieve the barcode 110. Furthermore, the other application at the mobile device 100 may perform, based at least on the data represented by the barcode 110, one or more operations.

Figure 1C:
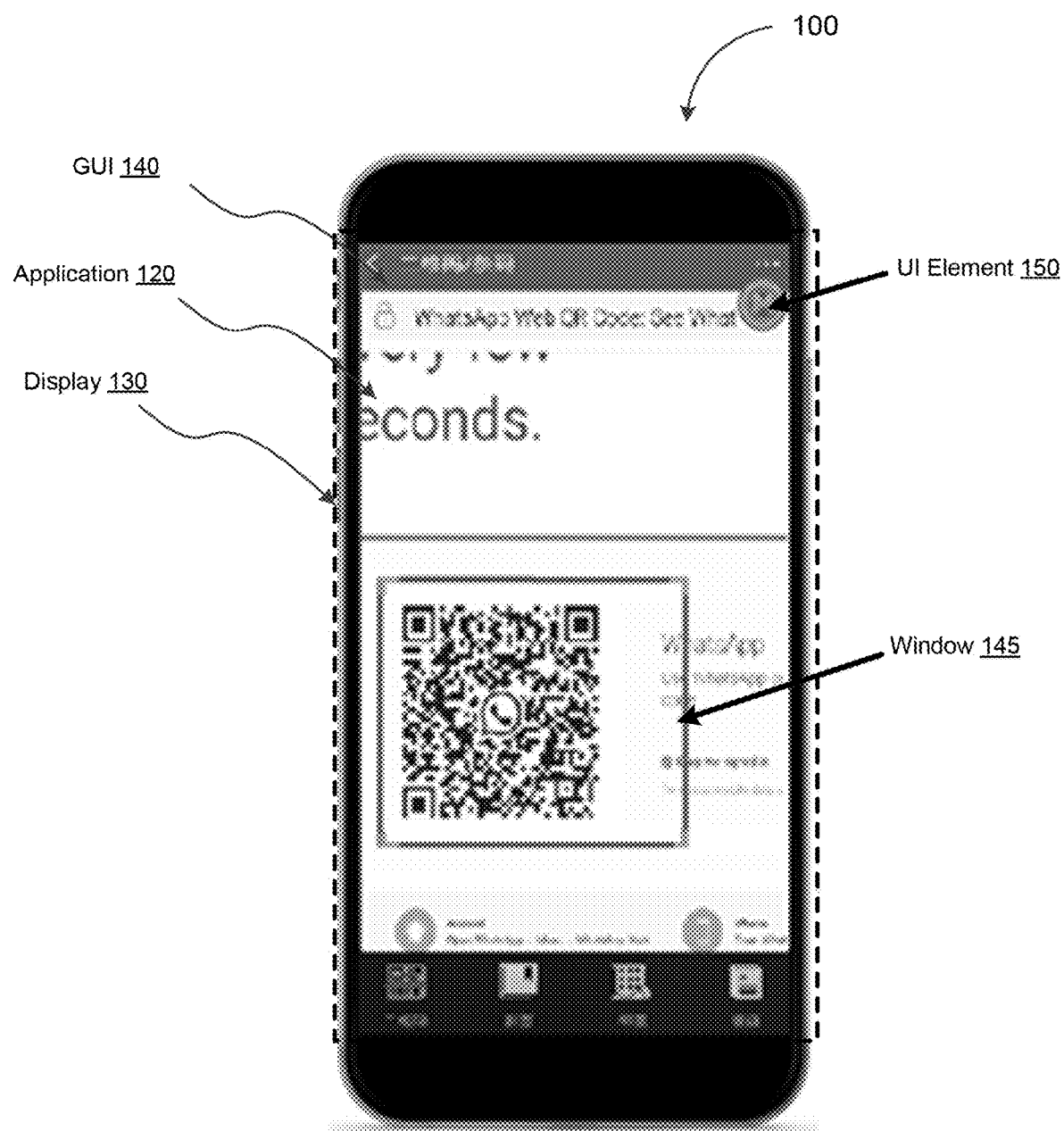
FIG. 1C depicts an example of a graphical user interface for capturing an image while a camera is in a loopback mode to bypass the camera, in accordance with some example embodiments.
Figure 1D:
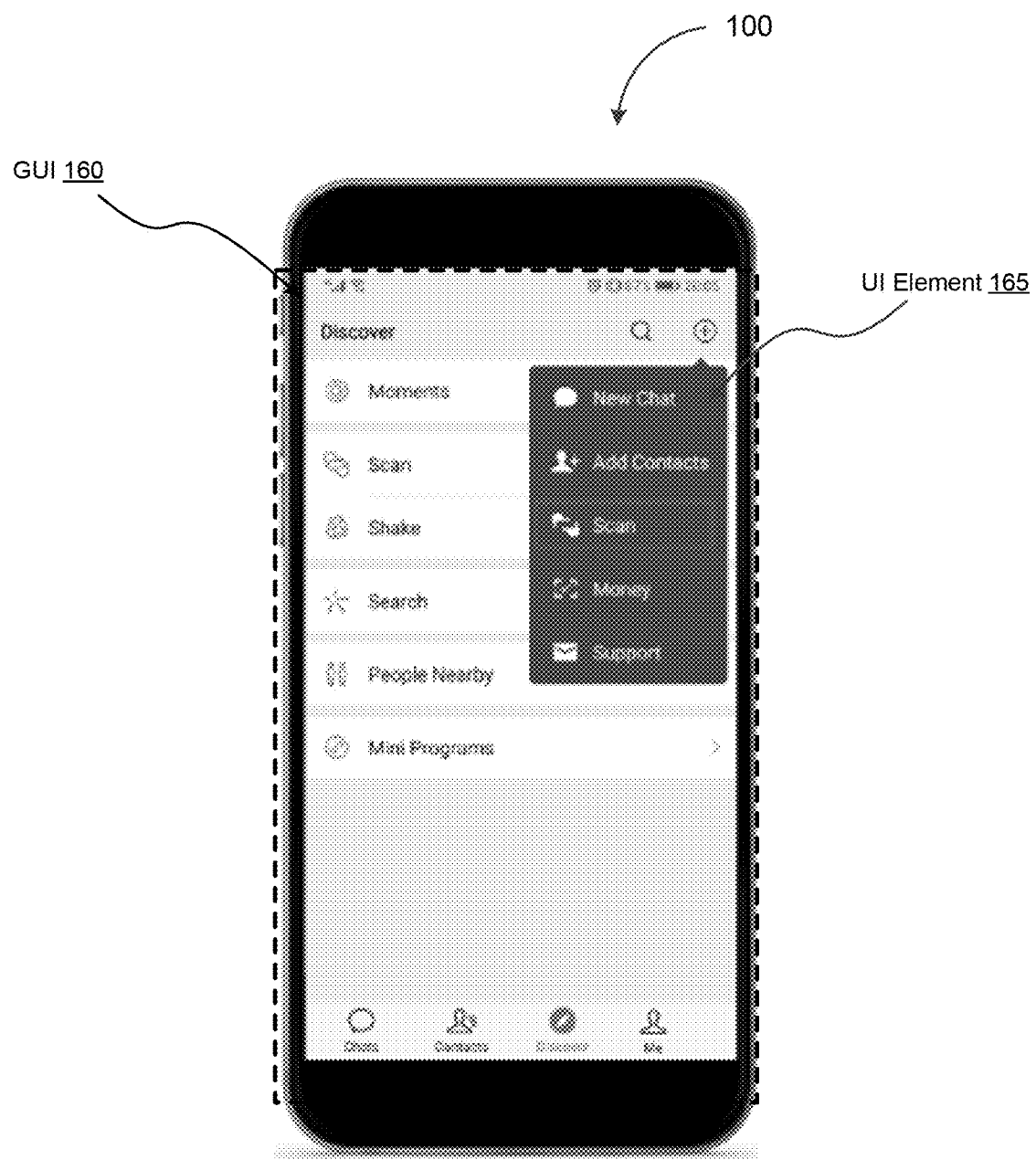
FIG. 1D depicts an example of a graphical user interface for activating a camera of a mobile device, in accordance with some example embodiments.

To further illustrate, FIG. 1C depicts an example of the graphical user interface 140 for capturing an image while the camera is in a loopback mode to bypass the camera, in accordance with some example embodiments. As noted, placing the camera in the loopback mode, for example, by selecting the user interface element 150, may bypass the camera such that the mobile device 100 may capture an image of the barcode 110 by at least generating a screenshot of the display 130 of the mobile device. In the example shown in FIG. 1C, the graphical user interface 140 may still include the window 145, which now defines a portion of the graphical user interface 140 forming the screenshot. The window 145 may be a floating window, which may be resized and/or moved within the graphical user interface 140 in order to be aligned with a portion of the graphical user interface 140 including the barcode 110. Aligning the window 145 to include the barcode 110 may enable the mobile device 100 to generate the screenshot to include a selective portion of the graphical user interface 140. For example, the screenshot may be generated, based at least on the window 145, to include a first portion of the graphical user interface 140 including the barcode 110 but omit a second portion of the graphical user interface 140 without the barcode 110.

Figure 2:
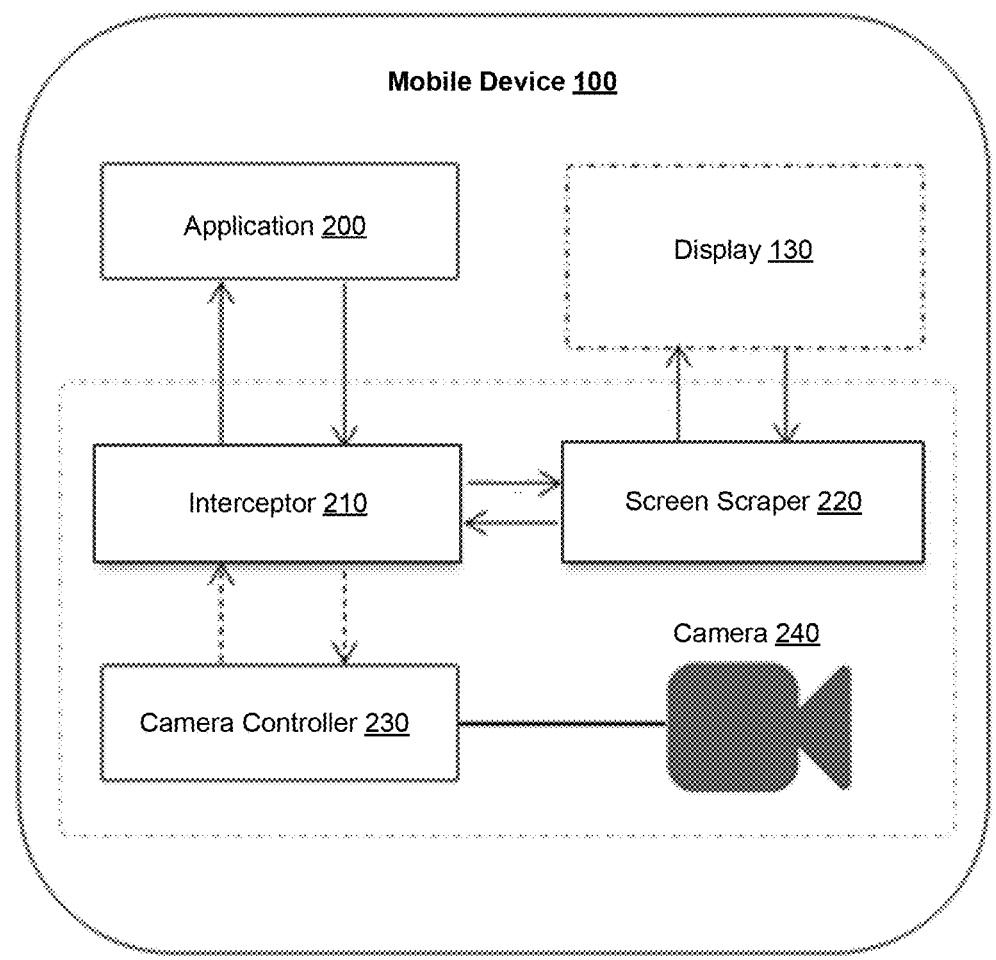
FIG. 2 depicts a block diagram illustrating an example of a mobile device, in accordance with some example embodiments.

FIG. 2 depicts a block diagram illustrating an example of the mobile device 100, in accordance with some example embodiments. Referring to FIGS. 1A-C and 2, the mobile device 100 may include an application 200, the display 130, an interceptor 210, a screen scraper 220, a camera controller 230, and a camera 240.

The application 200 may activate the camera 240 at the mobile device 100 in order to capture an image of the barcode 110 presented by the application 120 on the display 130 of the mobile device 100. The application 200 may require the data represented by the barcode 110 in order to perform one or more operations. Nevertheless, although the application 200 may have access to the camera 240 at the mobile device 100, the camera 240 may be incapable of capturing an image of the barcode 110 presented on the display 130 of the mobile device 100. As such, in some example embodiments, the camera 240 may be associated with a normal mode of operation and a loopback mode of operation. Placing the camera 240 in the loopback mode may bypass the camera 240 such that the mobile device 100 may capture an image of the barcode 110 by at least generating a screenshot of the display 130 of the mobile device 100. Contrastingly, placing the camera 240 in the normal mode may enable the camera to capture an image of one or more objects external to the mobile device 100.

In some example embodiments, the interceptor 210 may be configured to intercept the request from the application 200 to activate the camera 240. By intercepting the request to activate the camera 240, the interceptor 210 may prevent the camera 240 from being activated by the request from the application 200. Instead, the interceptor 210 may respond to the request from the application 200 to activate the camera 240 by at least presenting, on the display 130 of the mobile device 100, the graphical user interface 140. The graphical user interface 140 may be configured to receive one or more inputs setting an operation mode of the camera 240. For example, as shown in FIGS. 1B-C, the graphical user interface 140 may include the user interface element 150, which may enable a user to select between the normal mode of operation and the loopback mode of operation.

The interceptor 210 may determine, based at least on the one or more inputs received via the graphical user interface 140, whether the camera 240 is placed in a normal mode of operation or a loopback mode of operation. Referring again to FIG. 2, if the interceptor 210 determines that the camera 240 is placed in the normal mode of operation, the interceptor 210 may forward, to the camera controller 230, the request from the application 200. The camera controller 230 may respond to the request from the application 200 by at least activating the camera 240. As noted, when the camera 240 is placed in the normal mode of operation, activating the camera 240 may enable the camera 240 to capture one or more images of objects external to the mobile device 100.

Alternatively, if the interceptor 210 determines that the camera 240 is placed in a loopback mode of operation to bypass the camera 240, the interceptor 210 may capture an image of the barcode 110 by at least generating a screenshot of the display 130 of the mobile device 100. For example, the interceptor 210 may send, to the screen scraper 220, a request to generate the screenshot of the display 130 of the mobile device 100. The screen scraper 220 may respond to the request from the interceptor 210 by at least updating the graphical user interface 140 to include the window 145. As shown in FIG. 1C, the window 145 may be resized and moved to define a portion of the graphical user interface 140 forming the screenshot. For instance, the window 145 may be resized and/or moved within the graphical user interface 140 in order to be aligned with a first portion of the graphical user interface 140 including the barcode 110. The window 145 may be further aligned to omit a second portion of the graphical user interface 140 without the barcode 110. Once the window 145 is aligned with the barcode 110, the screen scraper 220 may generate the screenshot in response to one or more additional inputs from the user (e.g., one or more taps within the window 145 and/or the like).

Referring again to FIG. 2, the screen scraper 220 may be configured to send, to the interceptor 210, the screenshot of the portion of the graphical user interface 140 including the barcode 110. The interceptor 210 may further forward, to the application 200, the screenshot of the portion of the graphical user interface 140 including the barcode 110. According to some example embodiments, the application 200 may be parse the screenshot in order to retrieve the barcode 110. Moreover, the application 200 may perform, based at least on the data represented by the barcode 110, one or more operations.

Figure 3:
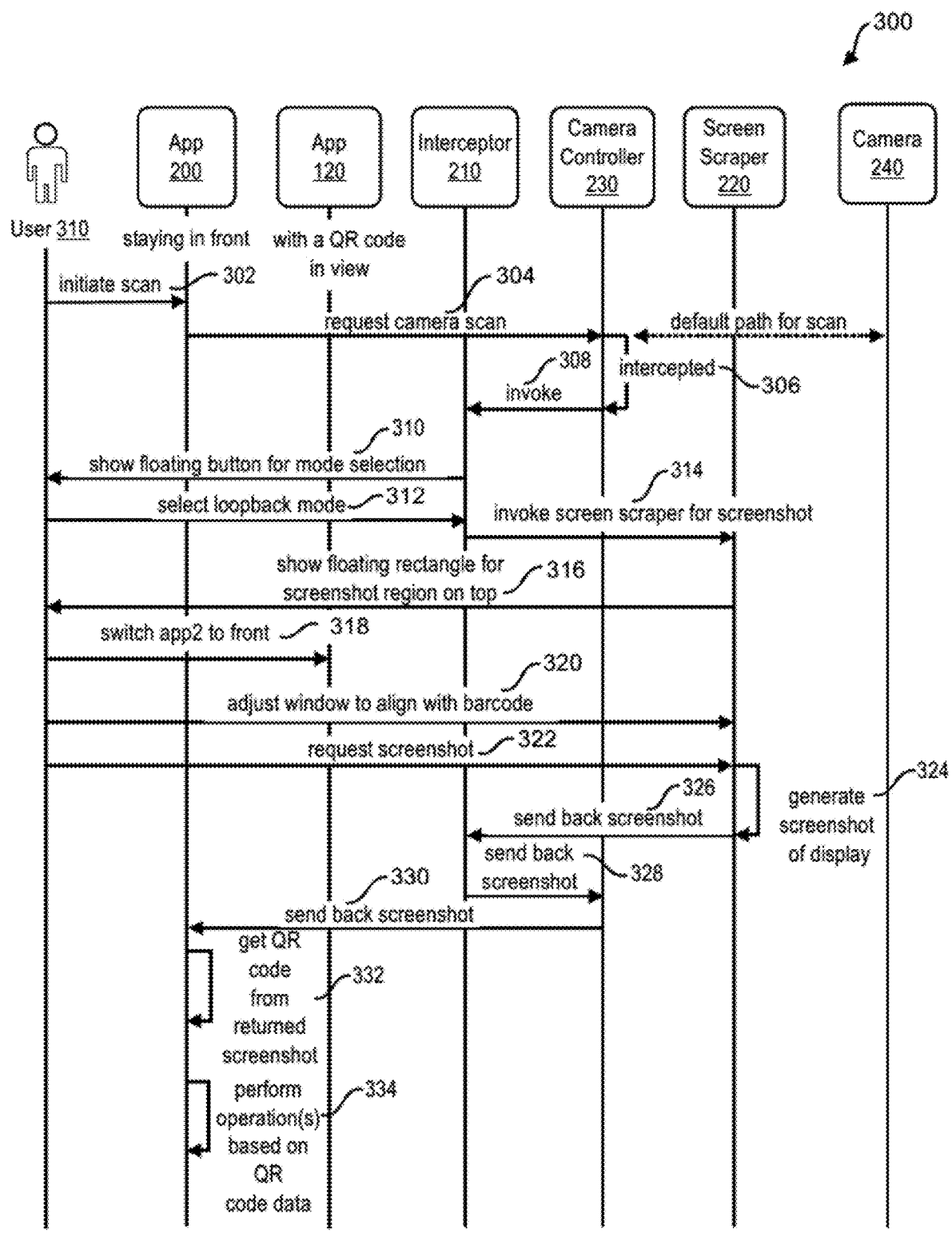
FIG. 3 depicts a sequence diagram illustrating an example of a process for capturing an image, in accordance with some example embodiments.

FIG. 3 depicts a sequence diagram illustrating an example of a process 300 for capturing an image, in accordance with some example embodiments. Referring to FIGS. 1A-C and 2-3, the process 300 may be performed at the mobile device 100 in order to capture an image of the barcode 110 presented by the application 120 on the display 130 of the mobile device 100.

At 302, a user 310 of the mobile device 100 may initiate a scan by at least sending a request to activate the camera 240 while the application 200 is active and the application 120 is inactive but passively running in a background. It should be appreciated that the application 200 may be active when the application 200 is visible in the display 130 of the mobile device 100 such that the user 310 is able to interact with the application 200. Contrastingly, the application 120 may be inactive while the application 120 is not visible in the display 130 of the mobile device 100. Although the user 310 may be unable to interact with the application 120 while the application 120 remains inactive, the application 120 may nevertheless be passively running in the background. Moreover, the application 120 may become active (and the application 200 may become inactive but passively running in the background) when the user 310 switches from the application 200 to the application 120 such that the application 120 is visible in the display 130 of the mobile device 100.

At 304, while the application 200 is active and visible in the display 130 of the mobile device 100, the application 200 may request to activate the camera 240. Activating the camera 240 may enable the camera 240 to capture one or more images of objects external to the mobile device 100. Nevertheless, activating the camera 240 may not enable the mobile device 100 to capture an image of the barcode 110 displayed by the application 120 in the display 130 of the mobile device 100. As such, instead of routing the request to the camera controller 230, the interceptor 210 may, at 306, intercept the request to activate the camera 240. Moreover, as shown in FIG. 3, at 308, the request to activate the camera 240 may invoke the interceptor 210. At 310, the interceptor 210 may respond to the intercepted request by at least presenting, on the display 130 of the mobile device 100, the graphical user interface 140. The graphical user interface 140 may include the user interface element 150, which may enable the user 310 to select between a normal mode of operation and a loopback mode of operation.

Referring again to FIG. 3, at 312, the user 310 may use the user interface element 150 to place the camera 240 in a loopback mode of operation. In response to the user 310 selecting the loopback mode of operation, the interceptor 210 may, at 314, invoke the screen scraper 220. For example, the interceptor 210 may send, to the screen scraper 220, a request to capture of screenshot of the display 130 of the mobile device 100. At 316, the screen scraper 220 may respond to the request from the interceptor 210 by at least updating the graphical user interface 140 presented on the display 130 of the mobile device 100 to include the window 145. At 318, the user 310 may switch from the application 200 to the application 120 associated with the barcode 110. As noted, switching from the application 200 to the application 120 may activate the application 120 including by rendering the application 120 visible in the display 130 of the mobile device 100. Accordingly, by switching to the application 120, the barcode 110 may become visible on the display 130 of the mobile device such that the user 310 may, at 320, adjust the window 145 (e.g., by resizing and/or moving the window 145) to align with the barcode 110.

At 322, once the window 145 is aligned with the barcode 110, the user 310 may request a screenshot of the display 130 of the mobile device 100. For example, the user 310 may request the screenshot of the display 130 of the mobile device 100 by providing one or more additional inputs (e.g., one or more taps within the window 145 and/or the like). At 324, the screen scraper 220 may respond to the request from the user 310 by at least capturing the screenshot of the display 130 at the mobile device 100. The screen scraper 220 may further send, to the application 200, the screenshot of the display 130 of the mobile device 100. In the example shown in FIG. 3, the screen scraper 220 may send, at 326, the screenshot to the interceptor 210. At 328, the interceptor 210 may return the screenshot back to the camera controller 230. The camera controller 230 may, at 330, send the screenshot to the application 200.

As noted, the application 200 may require the data represented by the barcode 110 in order to perform one or more operations. Accordingly, at 332, the application 200 may parse the screenshot of the display 130 of the mobile device 100 in order to retrieve the barcode 110. The application 200 may parse the screenshot to retrieve the barcode 110 once the user 310 reactivates the application 200, for example, by switching from the application 120 to the application 200. Alternatively, the application 200 may parse the screenshot to retrieve the barcode 110 even while the application 200 is inactive but running passively in the background. Furthermore, at 334, the application 200 may perform, based at least on the data represented by the barcode 110, one or more operations.

Figure 4:
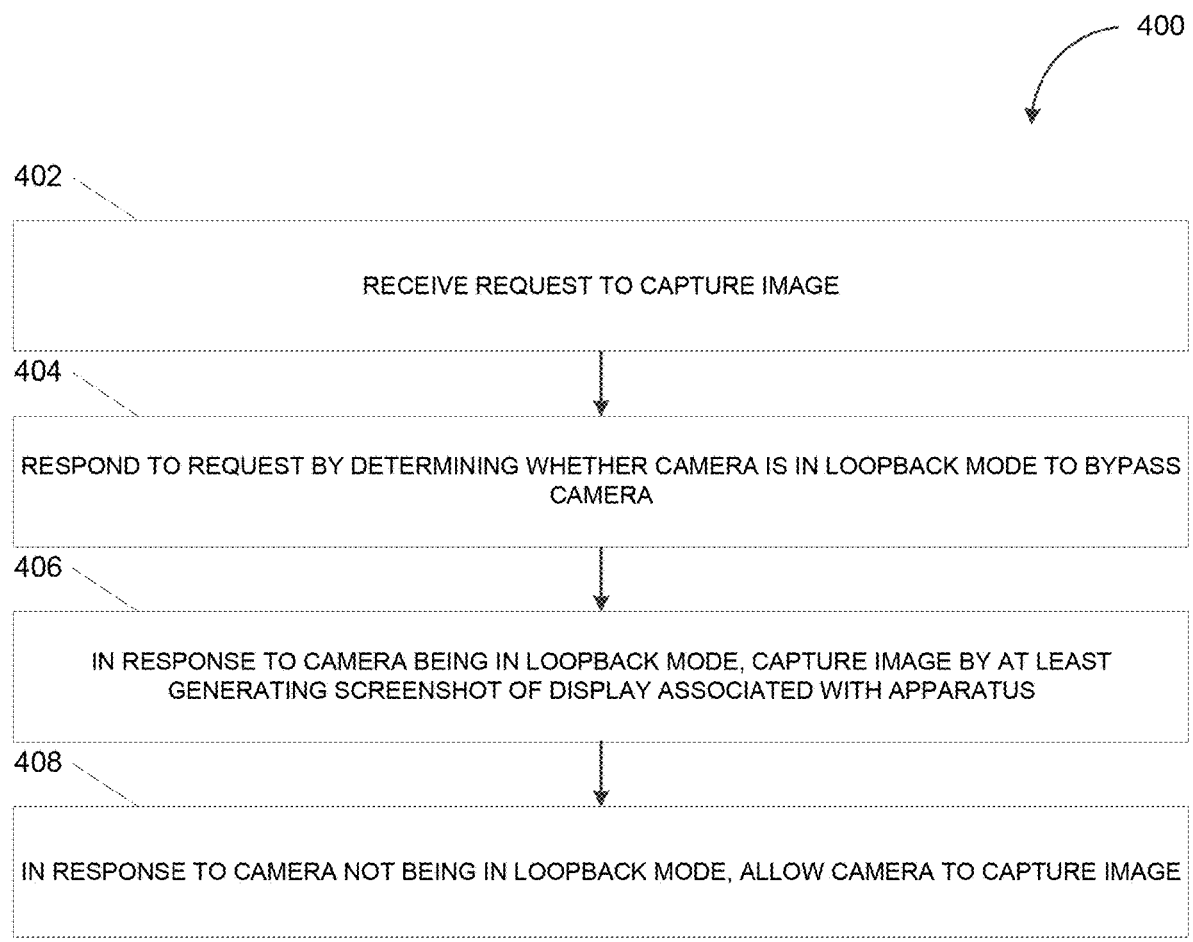
FIG. 4 depicts a flowchart illustrating an example of a process for capturing an image, in accordance with some example embodiments.

FIG. 4 depicts a flowchart illustrating an example of a process 400 for capturing an image, in accordance with some example embodiments. Referring to FIGS. 1A-C, 2, and 4, the process 400 may be performed by the mobile device 100.

At 402, the mobile device 100 may receive a request to capture an image. For example, the user 310 may send a request to activate the camera 240 while the application 200 is active, which may be the case when the application 200 is visible in the display 130 of the mobile device 100 and the user 310 is able to interact with the application 200. The application 200 may require the data represented by the barcode 110 in order to perform one or more operations. For example, the application 200 may require the data represented by the barcode 110 to complete an online transaction. The barcode 110 may be associated with the application 120, which may be inactive but still passively running in the background while the application 200 is active. In order to retrieve the barcode 110, the application 200 may require an image of the barcode 110 while the barcode 110 is presented on the display 130 of the mobile device.

At 404, the mobile device 100 may respond to the request by at least determining whether a camera at the mobile device 100 is in a loopback mode to bypass the camera. Although the application 200 may have access to the camera 240 at the mobile device 100, the camera 240 may be incapable of capturing an image of the barcode 110 presented on the display 130 of the mobile device 100. As such, in some example embodiments, the camera 240 may be associated with a normal mode of operation and a loopback mode of operation. Placing the camera 240 in the loopback mode may bypass the camera 240 such that the mobile device 100 may capture an image of the barcode 110 by at least generating a screenshot of the display 130 of the mobile device 100. Contrastingly, placing the camera 240 in the normal mode may enable the camera to capture an image of one or more objects external to the mobile device 100.

At 406, in response to the camera being in the loopback mode, the mobile device 100 may capture the image by at least generating a screenshot of a display associated with the mobile device 100. For example, if the mobile device 100 determines that the camera 240 is in the loopback mode of operation, the mobile device 100 may bypass the camera such that the mobile device 100 may capture an image of the barcode 110 by at least generating a screenshot of the display 130 of the mobile device 100. In some example embodiments, the mobile device 100 may respond to the camera 240 being in the loopback mode by at least updating the graphical user interface 140 presented in the display 130 of the mobile device 100 to include the window 145. The window 145 may be a floating window that be resized and/or moved within the graphical user interface 140 in order to be aligned with a portion of the graphical user interface 140 including the barcode 110. Aligning the window 145 to include the barcode 110 may enable the mobile device 100 to generate the screenshot to include a selective portion of the graphical user interface 140 presented on the display 130. As such, the screenshot may be generated, based at least on the window 145, to include a first portion of the graphical user interface 140 including the barcode 110 but omit a second portion of the graphical user interface 140 without the barcode 110.

At 408, in response to the camera not being in the loopback mode, the mobile device 100 may allow the camera to capture the image. For example, if the mobile device 100 determines that the camera 240 is not in loopback mode of operation, the mobile device 100 may allow the camera 240 to capture one or more images of objects external to the mobile device 100.

Figure 5:
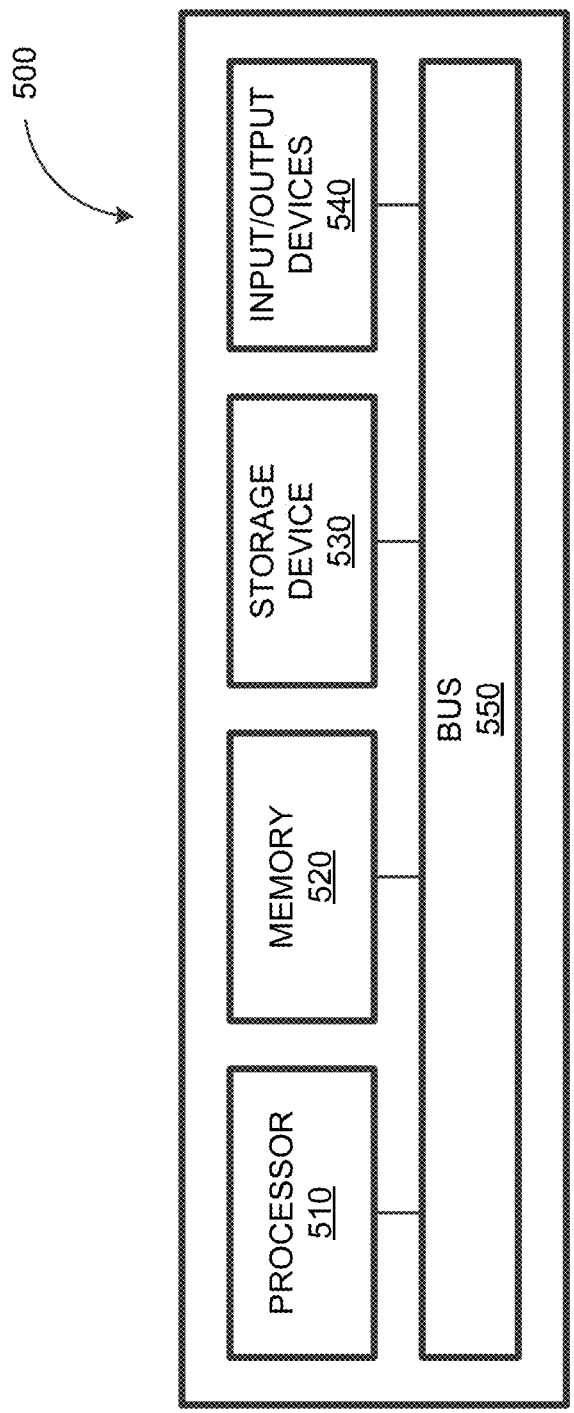
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1A-C and 2-5, the computing system 500 can be used to implement the mobile device 100 and/or any components therein. For example, the computing system 500 may implement a user equipment or another type of mobile device.

As shown in FIG. 5, the computing system 500 can include a processor 510, a memory 520, a storage device 530, and an input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the mobile device 100. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet, a public land mobile network (PLMN), and/or the like).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing items and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program item, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. An apparatus, comprising:
   a camera;
   a display;
   at least one data processor; and
   at least one memory storing instructions which, when executed by the at least one data processor, cause the apparatus to at least:
      receive, from a first application at the apparatus, a first request to activate the camera to capture an image;
      in response to the first request and while the first application remains visible in the display of the apparatus, present, on the display, a graphical user interface including a first user interface element configured to place the camera in a loopback mode to bypass the camera and a second user interface element configured to place the camera in a normal mode to enable the camera to capture the image;
      in response to the camera being placed in the loopback mode, capture the image by least generating a screenshot of the display such that the image includes at least a portion of a barcode presented on the display, the barcode being associated with a second application at the apparatus, and the screenshot being sent to the first application to at least enable the first application to parse the screenshot to retrieve the barcode; and
      in response to the camera being set in the normal mode, allow the camera to capture the image such that the image includes one or more objects external to the apparatus.

2. The apparatus of claim 1, wherein the apparatus is further caused to at least:
   receive, via the graphical user interface, a second request comprising a selection of the first user interface element to place the camera in the loopback mode or a selection of the second user interface element to place the camera in the normal mode.

3. The apparatus of claim 1, wherein the barcode displayed as part of a graphical user interface presented on the display.

4. The apparatus of claim 3, wherein the apparatus is further caused to at least:
in response to the camera being in the loopback mode, update the graphical user interface presented on the display to include a window defining a portion of the graphical user interface including the barcode.

5. The apparatus of claim 4, wherein the window is configured to be resized and moved within the graphical user interface to align with at least a portion of the graphical user interface including the barcode.

6. The apparatus of claim 1, wherein the apparatus is further caused to at least:
prior to the generating of the screenshot, switch to the second application such that the barcode associated with the second application is visible in the display of the apparatus.

7. A computer-implemented method, comprising:
receiving, from a first application at an apparatus, a first request to activate a camera at the apparatus to capture an image;
in response to the first request and while the first application remains visible in a display of the apparatus, presenting, on the display, a graphical user interface including a first user interface element configured to place a camera at the apparatus is in a loopback mode to bypass the camera and a second user interface element configured to place the camera in a normal mode to enable the camera to capture the image;
in response to the camera being placed in the loopback mode, capturing the image by least generating a screenshot of a display of the apparatus such that the image includes at least a portion of a barcode presented on the display, the barcode being associated with a second application at the apparatus, and the screenshot being sent to the first application to at least enable the first application to parse the screenshot to retrieve the barcode; and
in response to the camera not being in the loopback mode, allowing the camera to capture the image such that the image includes one or more objects external to the apparatus.

8. The method of claim 7, further comprising:
receiving, via the graphical user interface, a second request comprising a selection of the first user interface element to place the camera in the loopback mode or a selection of the second user interface element to place the camera in the normal mode.

9. The method of claim 7, wherein the barcode displayed as part of a graphical user interface presented on the display.

10. The method of claim 9, further comprising:
in response to the camera being in the loopback mode, updating the graphical user interface presented on the display to include a window defining a portion of the graphical user interface including the barcode.

11. The method of claim 10, wherein the window is configured to be resized and moved within the graphical user interface to align with at least a portion of the graphical user interface including the barcode.

12. The method of claim 7, further comprising:
prior to the generating of the screenshot, switching to the second application such that the barcode associated with the second application is visible in the display of the apparatus.

13. A non-transitory computer readable medium storing instructions, which when executed by at least one data processor, cause the at least one data processor to perform operations comprising:
receiving, from a first application at an apparatus, a first request to activate a camera at the apparatus to capture an image;
in response to the first request and while the first application remains visible in a display of the apparatus, presenting, on the display, a graphical user interface including a first user interface element configured to place a camera at the apparatus is in a loopback mode to bypass the camera and a second user interface element configured to place the camera in a normal mode to enable the camera to capture the image;
in response to the camera being placed in the loopback mode, capturing the image by least generating a screenshot of a display of the apparatus such that the image includes at least a portion of a barcode presented on the display, the barcode being associated with a second application at the apparatus, and the screenshot being sent to the first application to at least enable the first application to parse the screenshot to retrieve the barcode; and
in response to the camera not being in the loopback mode, allowing the camera to capture the image such that the image includes one or more objects external to the apparatus.

14. The computer-readable medium of claim 13, wherein the at least one data processor is further caused to perform operations comprising:
receiving, via the graphical user interface, a second request comprising a selection of the first user interface element to place the camera in the loopback mode or a selection of the second user interface element to place the camera in the normal mode.

15. The computer-readable medium of claim 13, wherein in response to the camera being in the loopback mode, a graphical user interface presented on the display is updated to include a window defining a portion of the graphical user interface including the barcode, and wherein the window is configured to be resized and moved within the graphical user interface to align with at least a portion of the graphical user interface including the barcode.

* * * * *